(12) United States Patent
Ikeda (10) Patent No.: US 10,326,125 B2
(45) Date of Patent: Jun. 18, 2019

(54) ELECTRODE PLATE MANUFACTURING METHOD

(71) Applicant: TOYOTA JIDOSHA KABUSHIKI KAISHA, Toyota-shi, Aichi-ken (JP)

(72) Inventor: Takenori Ikeda, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/360,445

(22) Filed: Nov. 23, 2016

(65) Prior Publication Data

US 2017/0155125 A1 Jun. 1, 2017

(30) Foreign Application Priority Data

Nov. 30, 2015 (JP) ................................. 2015-233492

(51) Int. Cl.

| | |
|---|---|
| *H01M 4/04* | (2006.01) |
| *B05C 1/12* | (2006.01) |
| *B05C 11/10* | (2006.01) |
| *H01M 10/0525* | (2010.01) |
| *B05C 1/00* | (2006.01) |

(Continued)

(52) U.S. Cl.
CPC .......... *H01M 4/0409* (2013.01); *B05C 1/003* (2013.01); *B05C 1/0865* (2013.01); *B05C 1/12* (2013.01); *B05C 11/1005* (2013.01); *H01M 4/0404* (2013.01); *H01M 4/0471* (2013.01); *H01M 10/0525* (2013.01); *B05C 1/0834* (2013.01); *B05D 5/12* (2013.01); *H01M 10/052* (2013.01)

(58) Field of Classification Search
CPC ............. H01M 4/0404; H01M 4/0409; H01M 4/0471; H01M 10/0525; B05C 1/12; B05C 11/1005; B05D 5/12
USPC .......................................... 427/115, 359, 365
See application file for complete search history.

(56) References Cited

U.S. PATENT DOCUMENTS

| | | | | |
|---|---|---|---|---|
| 3,682,133 A | * | 8/1972 | Gomarin .................... | B05C 1/12 118/202 |
| 2011/0033737 A1 | * | 2/2011 | Miyahisa ............ | H01M 2/1673 429/94 |

(Continued)

FOREIGN PATENT DOCUMENTS

| | | |
|---|---|---|
| JP | 11-323593 A | 11/1999 |
| JP | 2005-013889 A | 1/2005 |

(Continued)

*Primary Examiner* — Brian K Talbot
(74) *Attorney, Agent, or Firm* — Sughrue Mion, PLLC (57) ABSTRACT

An electrode plate manufacturing method of the present disclosure uses an electrode plate manufacturing apparatus including: a first roll and a second roll facing each other at a first position; and a third roll facing the second roll at a second position, and the manufacturing method rotates the first to the third rolls, feeds an electrode material at the first position, and brings a current collecting foil to pass through the second position. The electrode plate manufacturing apparatus includes: a flow passage roll having a flow passage thereinside and an outer circumferential surface disposed to be in contact with an outer circumferential surface of at least one of the first roll, the second roll, and the third roll; and a circulating unit circulating a fluid through the flow passage. The circulating unit circulates the fluid through the flow passage of the flow passage roll during manufacturing the electrode plate.

2 Claims, 3 Drawing Sheets

(51) Int. Cl.
*B05C 1/08* (2006.01)
B05D 5/12 (2006.01)
H01M 10/052 (2010.01)

(56) References Cited

U.S. PATENT DOCUMENTS

2011/0052954 A1* 3/2011 Fujiwara ............. H01M 4/0404
429/94
2016/0052010 A1* 2/2016 Hamabe .................. B05D 1/28
427/428.01
2016/0082467 A1* 3/2016 Mikami ............... B05C 1/0834
429/209
2016/0204434 A1* 7/2016 Uezono ................ H01M 4/505
429/209

FOREIGN PATENT DOCUMENTS

| JP | 2009-285916 A | 12/2009 | | |
|---|---|---|---|---|
| JP | 2013-018835 A | 1/2013 | | |
| JP | 2013-212673 A | 10/2013 | | |
| JP | 2015-141876 A | 8/2015 | | |
| JP | 2015141876 | * 8/2015 | ............ | H01M 4/139 |
| JP | 2015-157294 A | 9/2015 | | |

* cited by examiner

ELECTRODE PLATE MANUFACTURING METHOD

INCORPORATION BY REFERENCE

The disclosure of Japanese Patent Application No. 2015-233492 filed on Nov. 30, 2015 including the specification, drawings and abstract is incorporated herein by reference in its entirety.

BACKGROUND

1. Technical Field

The present disclosure relates to an electrode plate manufacturing method and an electrode plate manufacturing apparatus. More specifically, the present disclosure relates to an electrode plate manufacturing method and an electrode plate manufacturing apparatus to pass an electrode material between a pair of rolls so as to press the electrode material into an active material layer, and transfer this active material layer onto a surface of a current collecting foil to be formed into an electrode plate.

2. Description of Related Art

A battery such as a lithium ion secondary battery is configured by housing positive and negative electrode plates as well as an electrolytic solution inside a case. Each of the positive and the negative electrode plates includes a current collecting foil and an active material layer. The active material layer includes an electrode material containing an active material contributing to charge and discharge of the battery and a bonding material used for bonding the active material onto the current collecting foil, and others, thereby forming the active material layer. An example of related art directed to such an electrode plate manufacturing method may include Japanese Patent Application Publication No. 2015-141876, for example.

In JP 2015-141876 A, the electrode material made by the active material, the bonding material, and others is fed to a facing position where a first roll and a second roll face each other, and is passed through the facing position so as to be formed into the active material layer. The active material layer formed and adhering onto the second roll is brought to pass together with the current collecting foil through a facing position where the second roll and a third roll face each other, whereby the active material layer is transferred onto the current collecting foil. In this manner, an electrode plate having the active material layer on the current collecting foil is manufactured.

SUMMARY

Unfortunately, in the aforementioned related art, it is difficult to manufacture an electrode plate having a long length in a conveyance direction while forming thereon an active material layer with a constant thickness in this conveyance direction at the same time. Specifically, the electrode material is pressed at the facing position between the first roll and the second roll to be formed into an active material layer. In addition, the active material layer on the second roll is pressed together with a current collecting foil in the thickness direction at the facing position between the second roll and the third roll so as to be transferred onto the current collecting foil.

Consequently, heat is generated at the facing position between the first roll and the second roll and at the facing position between the second roll and the third roll due to friction therebetween. The generated heat increases temperatures of the first roll, the second roll, and the third roll. The increase in temperature causes the first roll, the second roll, and the third roll to expand in a radial direction, and thus a gap at the facing position where the first roll and the second roll face each other, and a gap at the facing position where the second roll and the third roll face each are respectively changed. In the electrode plate manufactured by bringing the electrode material to pass through the facing positions where the respective rolls face one another, a thickness of the active material layer varies because of the change in gaps at the facing positions where the respective roll face one another.

The present disclosure provides a manufacturing method and a manufacturing apparatus of an electrode plate having an active material layer with a uniform thickness thereon.

A first aspect of the present disclosure is directed to a manufacturing method of an electrode plate, the manufacturing method using an electrode plate manufacturing apparatus including: a first roll that has a first outer circumferential surface; a second roll that has a second outer circumferential surface facing the first outer circumferential surface, the second roll rotating in a direction in which a moving direction of the second outer circumferential surface at a first position where the first outer circumferential surface and the second outer circumferential surface face each other becomes the same as a moving direction of the first outer circumferential surface; a third roll that has a third outer circumferential surface facing the second outer circumferential surface at a second position different from the first position, the third roll rotating in a direction in which a moving direction of the third outer circumferential surface at the second position becomes the same as the moving direction of the second outer circumferential surface; at least one flow passage roll that includes a flow passage thereinside, the flow passage roll having an outer circumferential surface so disposed as to be in contact with at least one of the first outer circumferential surface, the second outer circumferential surface and the third outer circumferential surface; and a circulating unit to configured to circulate a fluid through the flow passage, and the manufacturing method includes: circulating the fluid through the flow passage by the circulating unit; bringing an electrode material containing an active material and a bonding material to pass through the first position so as to form an active material layer on the second roll; and winding a current collecting foil on the third roll, and bringing the current collecting foil to pass through the second position so as to transfer the active material layer on the second roll onto the current collecting foil to be formed into an electrode plate.

In the first aspect of the present disclosure, it is possible to suppress change in temperature of a roll of the first roll, the second roll, and the third roll that is in contact with at least one flow passage roll by using this flow passage roll having the flow passage through which the fluid is circulated by the circulating unit. Accordingly, it is possible to suppress deformation among the rolls due to the change in temperature of the rolls, thereby manufacturing the electrode plate having the active substance layer with a uniform thickness.

In the aforementioned electrode plate manufacturing method, a hardness of an outer circumferential surface of the at least one flow passage roll may be smaller than a hardness of at least one of the first outer circumferential surface, the second outer circumferential surface and the outer circumferential surface in contact with the outer circumferential surface of the at least one flow passage roll. This is because the outer circumferential surface of the flow passage roll can be deformed so as to increase a contact area between the flow passage roll and the roll in contact with the flow passage roll, whereby heat is smoothly transferred therebetween. Therefore, it is possible to further suppress the change in temperature of the roll in contact with the flow passage roll.

In the first aspect of the present disclosure, the at least one flow passage roll may have the outer circumferential surface covered with a carbon fiber layer made of carbon fibers. This is because carbon fibers have a high elasticity, a high heat transfer coefficient, and a high abrasion resistance. Hence, it is possible to appropriately suppress the change in temperature of the roll in contact with the flow passage roll, and also enhance durability of the flow passage roll.

In the first aspect of the present disclosure, the electrode plate manufacturing apparatus may include: a temperature output unit configured to detect and to output a temperature of at least one of the first roll, the second roll and the third roll in contact with the at least one flow passage roll; and a temperature adjusting unit configured to adjust a temperature of the fluid such that the temperature of the fluid when the temperature output from the temperature output unit is high is set to be lower than the temperature of the fluid when the temperature output from the temperature output unit is low. This is because the temperature of the fluid is adjusted depending on the degree of change in temperature of the roll in contact with the flow passage roll, thereby setting the temperature of the roll to be a temperature before the change in temperature of the roll in a shorter time if the change in temperature occurs in the roll.

In the first aspect of the present disclosure, the electrode plate manufacturing apparatus may include a temperature output unit configured to detect and to output a temperature of at least one of the first roll, the second roll and the third roll in contact with the at least one flow passage roll, and the circulating unit configured to adjust a flow rate of the fluid such that the flow rate of the fluid when the temperature output from the temperature output unit is high is set to be higher than the flow rate of the fluid when the temperature output from the temperature output unit is low. This is because the flow rate of the fluid is adjusted depending on the degree of change in temperature of the roll in contact with the flow passage roll, whereby the temperature of the roll can be set to be a temperature before the change in temperature of the roll in a shorter time if the change in temperature occurs in the roll.

In the first aspect of the present disclosure, the at least one flow passage roll of the electrode plate manufacturing apparatus may be provided to the second roll. The second roll comes into contact with a material to be an active material layer at the first position where the electrode material is formed into the active material layer and at the second position where the active material layer is transferred onto the current collecting foil. This is because it is more likely to form the active material layer with a uniform thickness by suppressing the change in temperature of the second roll than by suppressing the change in temperature of the first roll or the second roll.

In the first aspect of the present disclosure, the at least one flow passage roll of the electrode plate manufacturing apparatus may be provided to each of the second roll and the third roll. The electrode plate is manufactured by transferring the active material layer onto the current collecting foil at the second position. Hence, it is more likely to form the active material layer with a uniform thickness by suppressing the change in temperature of the third roll regarding the second position than by suppressing the change in temperature of the first roll.

In the first aspect of the present disclosure, the at least one flow passage roll of the electrode plate manufacturing apparatus may be provided to each of the first roll, the second roll and the third roll. This is because by suppressing the change in temperature of each of the first roll, the second roll, and the third roll, it is possible to form the active material layer with a uniform thickness.

A second aspect of the present disclosure is directed to an electrode plate manufacturing apparatus including: a first roll that has a first outer circumferential surface; a second roll that has a second outer circumferential surface facing the first outer circumferential surface, the second roll rotating in a direction in which a moving direction of the second outer circumferential surface at a first position where the first outer circumferential surface and the second outer circumferential surface face each other becomes the same as a moving direction of the first outer circumferential surface; a third roll that has a third outer circumferential surface facing the second outer circumferential surface at a second position different from the first position, the third roll rotating in a direction in which a moving direction of the third outer circumferential surface at the second position becomes the same as the moving direction of the second outer circumferential surface; at least one flow passage roll that includes a flow passage thereinside, the flow passage roll having an outer circumferential surface so disposed as to be in contact with at least one of the first outer circumferential surface, the second outer circumferential surface and the third outer circumferential surface; and a circulating unit configured to circulate a fluid through the flow passage.

According to the present disclosure, provided are a manufacturing method and a manufacturing apparatus of an electrode plate having an active material layer with a uniform thickness.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment in which the present disclosure is embodied will be described in details with reference to drawings, hereinafter.

Figure 1:
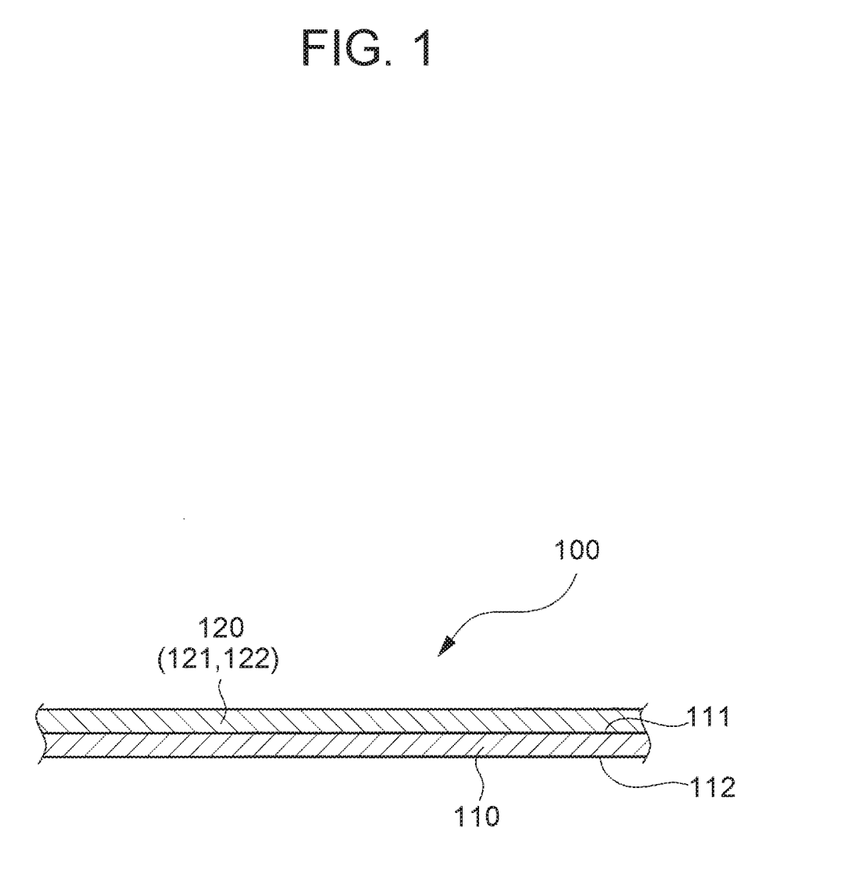
FIG. 1 is a sectional view of an electrode plate according to an embodiment.

An electrode plate 100 manufactured in the present embodiment will be described with reference to FIG. 1, hereinafter. The electrode plate 100 includes a current collecting foil 110 and an active material layer 120, as shown in a sectional view of FIG. 1. The electrode plate 100 is configured to be long in a right and left direction in FIG. 1.

In the electrode plate 100 of the present embodiment, the active material layer 120 is formed only on a first surface 111 of the current collecting foil 110. The electrode plate 100 is used as a positive electrode or a negative electrode configuring each secondary battery, such as a lithium ion secondary battery. The electrode plate 100 is appropriately cut into a required size if the electrode plate 100 is used as a positive electrode or a negative electrode in manufacturing of each secondary battery.

As the current collecting foil 110, a metallic foil may be used, for example. The active material layer 120 at least includes an active material 121 and a bonding material 122. The active material 121 contributes to charge and discharge in a battery. The bonding material 122 bonds materials included in the active material layer 120 to one another so as to form the active material layer 120, and also bonds this active material layer 120 onto a first surface 111 of the current collecting foil 110.

Specifically, if the electrode plate 100 is a positive electrode of each lithium ion secondary battery, an aluminum foil may be used as the current collecting foil 110, $LiNi_{0.5}Mn_{1.5}O_4$ may be used as the active material 121, and polyvinylidene fluoride (PVDF) may be used as the bonding material 122, for example. Alternatively, if the electrode plate 100 is a negative electrode of each lithium ion secondary battery, a copper foil may be used as the current collecting foil 110, a carbon material may be used as the active material 121, and a styrene-butadiene rubber (SBR) may be used as the bonding material 122, for example. The active material layer 120 may further appropriately include materials, such as an electric conductive material to promote electric conductivity in the active material layer 120 in addition to the active material 121 and the bonding material 122.

Figure 2:
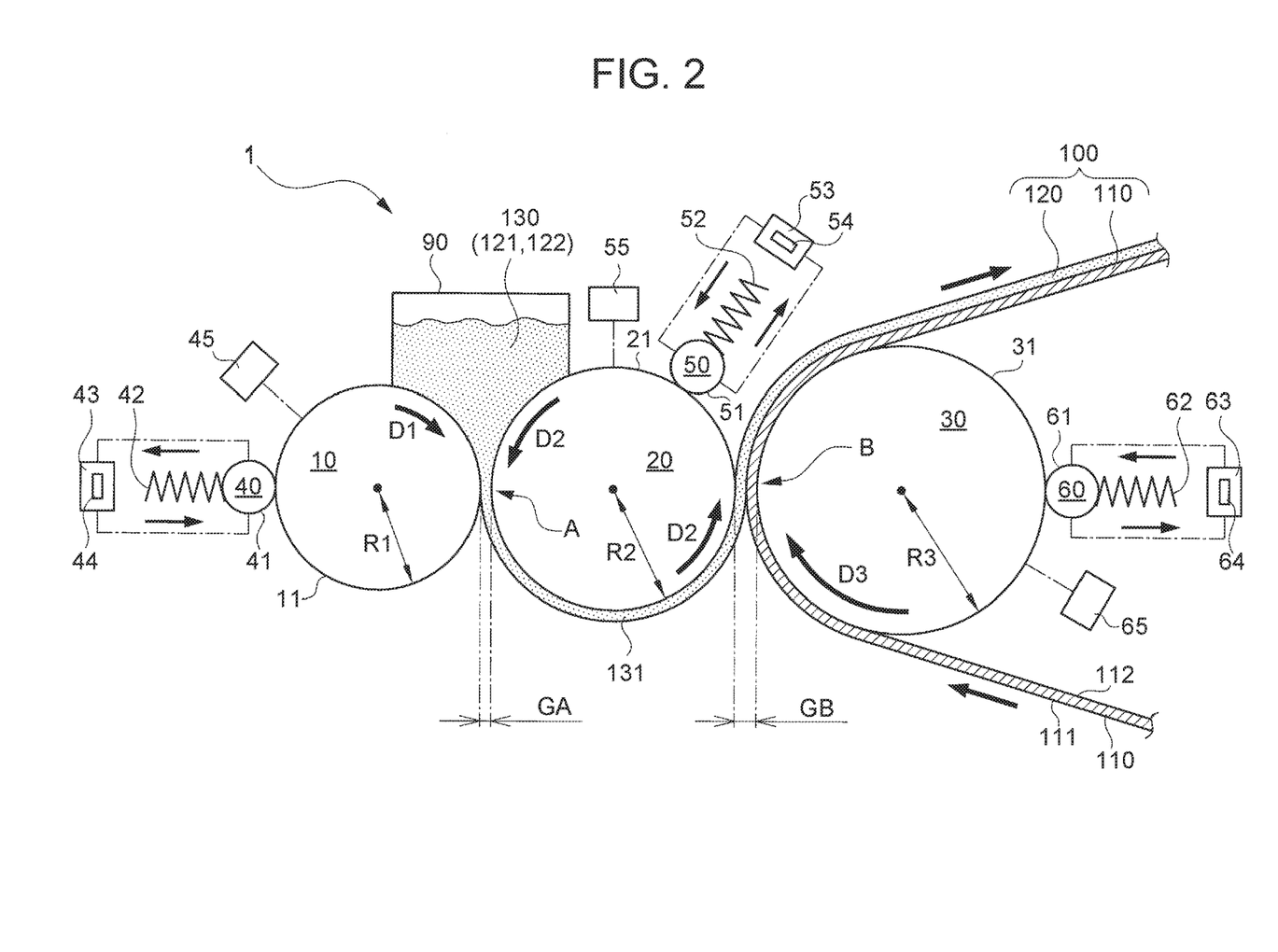
FIG. 2 is a schematic view of a configuration of an electrode plate manufacturing apparatus according to the embodiment.

An electrode plate manufacturing apparatus used for manufacturing the electrode plate 100 in the present embodiment will be described, hereinafter. FIG. 2 shows a schematic view of a configuration of the electrode plate manufacturing apparatus 1 of the present embodiment. The electrode plate manufacturing apparatus 1 includes a first roll 10, a second roll 20, and a third roll 30 as shown in FIG. 2. In FIG. 2, an up and down direction corresponds to a vertical direction, and gravity acts in a downward direction.

In the electrode plate manufacturing apparatus 1 of the present embodiment, each of the first roll 10, the second roll 20, and the third roll 30 is disposed with its axial direction horizontally extending. Each of the first roll 10, the second roll 20, and the third roll 30 is made of a material of which hardness and strength are high, such as metal, for example. Specifically, as the material of the first roll 10, the second roll 20, and the third roll 30, a high-carbon chromium bearing steel material (SUJ2) may be used, for example. Each of the first roll 10 and the second roll 20 is arranged in parallel with each other such that a first outer circumferential surface 11 of the first roll 10 and a second outer circumferential surface 21 of the second roll 20 face each other at a first facing position A. The third roll 30 is arranged in parallel with the second roll 20 such that the second outer circumferential surface 21 of the second roll 20 and a third outer circumferential surface 31 of the third roll 30 face each other at a second facing position B.

FIG. 2 shows a radius R1 of the first roll 10, a radius R2 of the second roll 20, and a radius R3 of the third roll 30. In the present embodiment, the radius R2 of the second roll 20 is greater than the radius R1 of the first roll 10. The radius R3 of the third roll 30 is greater than the radius R2 of the second roll 20. Specifically, the respective radiuses of the first roll 10, the second roll 20, and the third roll 30 become greater in this order.

The first roll 10 and the second roll 20 are so held as to have a constant inter-axis distance therebetween. There is provided a gap GA between the first outer circumferential surface 11 of the first roll 10 and the second outer circumferential surface 21 of the second roll 20 at the first facing position A. The third roll 30 is so held as to have a constant inter-axis distance relative to the second roll 20. There is provided a gap GB between the second outer circumferential surface 21 of the second roll 20 and a third outer circumferential surface 31 of the third roll 30 at the second facing position B.

Each of the first roll 10, the second roll 20, and the third roll 30 is configured to rotate during manufacturing the electrode plate 100. In FIG. 2, a rotational direction of the first roll 10 is indicated by an arrow D1, a rotational direction of the second roll 20 is indicated by an arrow D2, and a rotational direction of the third roll 30 is indicated by an arrow D3, respectively. In other words, the respective rotational directions of the first roll 10 and the third roll 30 are clockwise, and the rotational direction of the second roll 20 is counterclockwise, in FIG. 2.

Hence, the respective rotational directions of the first roll 10 and the second roll 20 become the same when moving directions of the first outer circumferential surface 11 and the second outer circumferential surface 21 at the first facing position A are both in a vertically downward direction. The rotational direction of the third roll 30 is a direction in which a moving direction of the third outer circumferential surface 31 becomes the same as the moving direction of the second outer circumferential surface 21 of the second roll 20 at the second facing position B.

The second roll 20 rotates at a faster circumferential speed than a circumferential speed of the first roll 10. The third roll 30 rotates at a faster circumferential speed than the circumferential speed of the second roll 20. Specifically, the respective circumferential speeds of the first roll 10, the second roll 20, and the third roll 30 become faster in this order.

An electrode material 130 is fed toward the first facing position A from an upper position of the first facing position A. The electrode material 130 is a material used for forming the active material layer 120 of the electrode plate 100. Hence, the electrode material 130 at least includes the active material 121 and the bonding material 122. The electrode material 130 may be made by power components of the active material 121, the bonding material 122, and others. Alternatively, the electrode material 130 may be made by adding a solvent to power components of the active material 121, the bonding material 122, and others. If the active material layer 120 contains materials other than the active material 121 and the bonding material 122, the materials may also be contained in the electrode material 130.

A partitioning unit 90 is disposed above the first facing position A. The partitioning unit 90 is a partition to prevent the electrode material 130 from dropping from an upper position of the first facing position A, that is, from top surfaces of the first roll 10 and the second roll 20. The electrode material 130 above the first facing position A is collected inside the partitioning unit 90.

As shown in FIG. 2, the current collecting foil 110 is wounded on the third outer circumferential surface 31 of the third roll 30. The current collecting foil 110 is wound on the third roll 30 at the second facing position B in such a manner that a second surface 112 of the current collecting foil 110 faces the third outer circumferential surface 31 of the third roll 30. Hence, the current collecting foil 110 is conveyed by the rotation of the third roll 30.

The first surface 111 of the current collecting foil 110 faces the second outer circumferential surface 21 of the second roll 20 at the second facing position B. As aforementioned, the third roll 30 rotates at a faster circumferential speed than that of the second roll 20. Therefore, a moving speed of the first surface 111 of the current collecting foil 110 at the second facing position B is faster than a moving speed of the second outer circumferential surface 21 of the second roll 20 at the second facing position B.

As shown in FIG. 2, the current collecting foil 110 is fed from a lower right side of the third roll 30 into the electrode plate manufacturing apparatus 1, and after passing through the second facing position B, the current collecting foil 110 is conveyed in a manner as to be discharged toward an upper right side of the third roll 30. When the current collecting foil 110 is fed into the electrode plate manufacturing apparatus 1, nothing is formed on the first surface 111 of the current collecting foil 110. The electrode plate manufacturing apparatus 1 is configured to form the active material layer 120 on the first surface 111 of the current collecting foil 110 at the second facing position B, thereby manufacturing the electrode plate 100.

The electrode plate manufacturing apparatus 1 of the present embodiment further includes a first flow passage roll 40, a second flow passage roll 50, and a third flow passage roll 60. The first flow passage roll 40 is pushed against the first roll 10 by a first pushing unit 42. Through this, a fourth outer circumferential surface 41 of the first flow passage roll 40 is in contact with the first outer circumferential surface 11 of the first roll 10. A contact position of the first flow passage roll 40 with the first roll 10 is a position different from the first facing position A. The first flow passage roll 40 is configured to passively rotate by a friction force against the first roll 10 in contact with the first flow passage roll 40.

The second flow passage roll 50 is pushed against the second roll 20 by a second pushing unit 52. Through this, a fifth outer circumferential surface 51 of the second flow passage roll 50 is in contact with the second outer circumferential surface 21 of the second roll 20. A contact position of the second flow passage roll 50 with the second roll 20 is a position located within a range downstream of the second facing position B and upstream of the first facing position A in the rotational direction of the second roll 20. The second flow passage roll 50 is configured to passively rotate by a friction force against the second roll 20 in contact with the second flow passage roll 50.

The third flow passage roll 60 is pushed against the third roll 30 by a third pushing unit 62. Through this, a sixth outer circumferential surface 61 of the third flow passage roll 60 is in contact with the third outer circumferential surface 31 of the third roll 30. A contact position of the third flow passage roll 60 with the third roll 30 is a position on the third roll 30 on which no current collecting foil 110 is wounded. The third flow passage roll 60 is configured to passively rotate by a friction force against the third roll 30 in contact with the third flow passage roll 60.

In the present embodiment, as shown in FIG. 2, a compression spring is used as each of the first pushing unit 42, the second pushing unit 52, and the third pushing unit 62. However, as each of the first pushing unit 42, the second pushing unit 52, and the third pushing unit 62, a pneumatic cylinder or the like may be used other than a compression spring.

Figure 3:
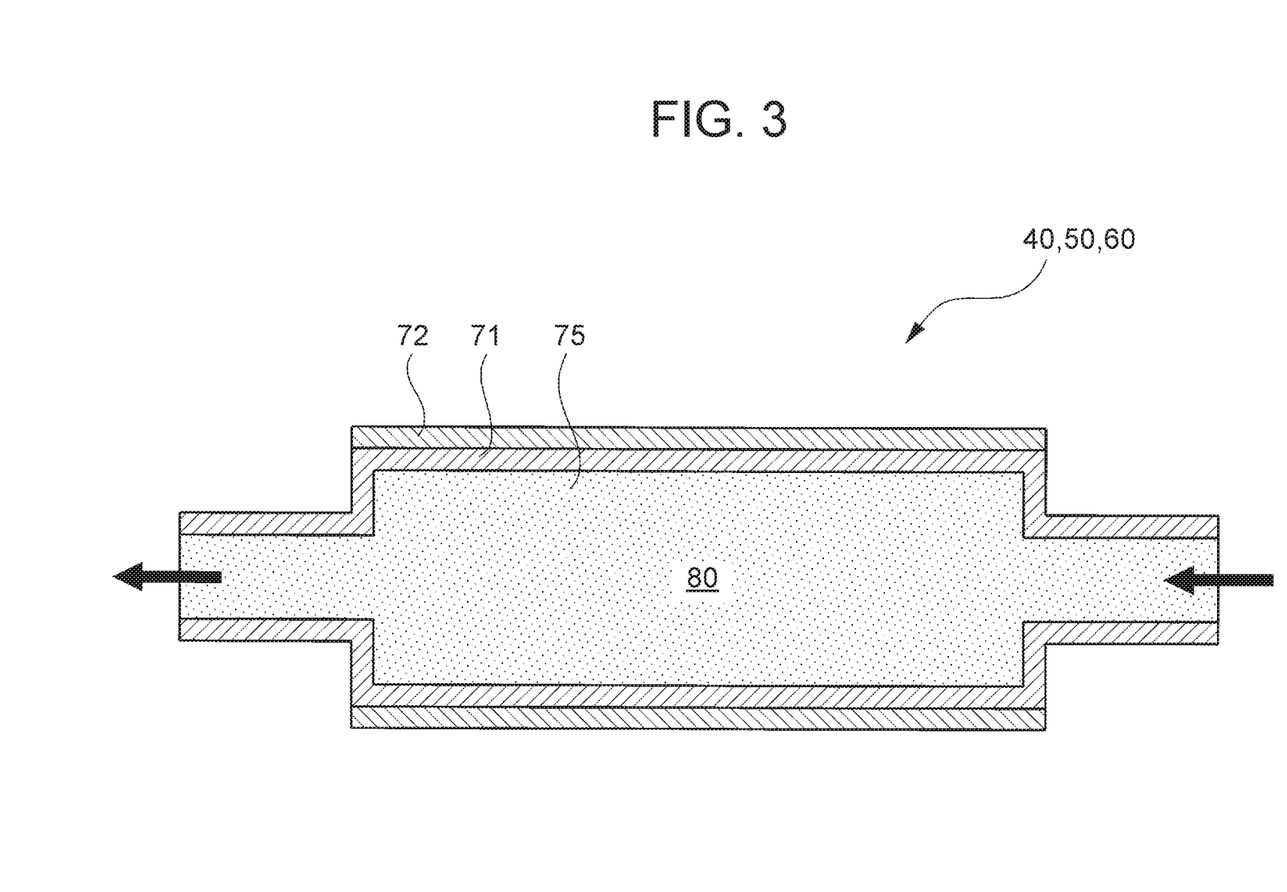
FIG. 3 is a sectional view of a flow passage roll.

In the present embodiment, the same configuration is employed in each of the first flow passage roll 40, the second flow passage roll 50, and the third flow passage roll 60. FIG. 3 shows a sectional view of each of the first flow passage roll 40, the second flow passage roll 50, and the third flow passage roll 60. The right and left direction corresponds to an axial direction of each of the first flow passage roll 40, the second flow passage roll 50, and the third flow passage roll 60.

As shown in FIG. 3, each of the first flow passage roll 40, the second flow passage roll 50, and the third flow passage roll 60 has a cored bar 71 and an elastic layer 72. The cored bar 71 is hollow and its inner space serves as a flow passage 75 that allows a fluid 80 to flow therethrough. For example, aluminum may be used as a material of the cored bar 71.

The elastic layer 72 covers the cored bar 71 from a radially outer side thereof. The elastic layer 72 has a smaller hardness than those of the first roll 10, the second roll 20, and the third roll 30, and also has elasticity. The elastic layer 72 may have a high heat transfer coefficient. The elastic layer 72 may have a high abrasion resistance. In the present embodiment, carbon fibers having a thickness of approximately 500 μm to 1 mm are used as the elastic layer 72. As the elastic layer 72, graphite vertical orientation thermal conductive sheet may be used in light of the elasticity, the heat transfer coefficient, the abrasion resistance, and others. Specifically, as the elastic layer 72, TC-001D manufactured by Hitachi Chemical Co., Ltd. is used in the present embodiment.

As shown in FIG. 2, a first circulating unit 43 is connected to the first flow passage roll 40. A second circulating unit 53 is connected to the second flow passage roll 50. A third circulating unit 63 is connected to the third flow passage roll 60. The first circulating unit 43, the second circulating unit 53, and the third circulating unit 63 of the present embodiment are configured to circulate the fluid 80 through the inside of each flow passage of the corresponding flow passage rolls connected to the respective circulating units, as indicated by arrows in FIG. 3.

In addition, the first circulating unit 43, the second circulating unit 53, and the third circulating unit 63 of the present embodiment have a first temperature adjusting unit 44, a second temperature adjusting unit 54, and a third temperature adjusting unit 64, respectively. The first temperature adjusting unit 44, the second temperature adjusting unit 54, and the third temperature adjusting unit 64 are configured to adjust a temperature of the fluid 80 respectively circulated by the first circulating unit 43, the second circulating unit 53, and the third circulating unit 63. Specifically, each of the first temperature adjusting unit 44, the second temperature adjusting unit 54, and the third temperature adjusting unit 64 is a cooling device capable of decreasing a temperature of the fluid 80 to be circulated. As the fluid 80 to be circulated, water may be used, for example.

The electrode plate manufacturing apparatus 1 of the present embodiment includes a first temperature sensor 45, a second temperature sensor 55, and a third temperature sensor 65. The first temperature sensor 45 has its detecting position on the first outer circumferential surface 11 of the first roll 10, and detects and outputs a temperature of the first roll 10. The second temperature sensor 55 has its detecting position on the second outer circumferential surface 21 of the second roll 20, and detects and outputs a temperature of the second roll 20. The third temperature sensor 65 has its detecting position on the third outer circumferential surface 31 of the third roll 30, and detects and outputs a temperature of the third roll 30. As each of the first temperature sensor 45, the second temperature sensor 55, and the third temperature sensor 65, an infrared temperature sensor capable of detecting a temperature of an object in a non-contact state using an infrared ray may be used.

The first circulating unit 43 of the present embodiment decreases the temperature of the fluid 80 to be circulated in the first flow passage roll 40 to be lower as a temperature of the first roll 10 output by the first temperature sensor 45 becomes higher. Through this, the first circulating unit 43 can decrease the temperature of the first flow passage roll 40 to be lower as the temperature of the first roll 10 becomes higher. The second circulating unit 53 of the present embodiment decreases the temperature of the fluid 80 to be circulated in the second flow passage roll 50 to be lower as a temperature of the second roll 20 output by the second temperature sensor 55 becomes higher. Through this, the second circulating unit 53 can decrease the temperature of the second flow passage roll 50 to be lower as the temperature of the second roll 20 becomes higher. In addition, the third circulating unit 63 of the present embodiment decreases the temperature of the fluid 80 to be circulated in the third flow passage roll 60 to be lower as a temperature of the third roll 30 output by the third temperature sensor 65 becomes higher. Through this, the third circulating unit 63 can decrease the temperature of the third flow passage roll 60 to be lower as the temperature of the third roll 30 becomes higher. Degree of decrease in temperature of the fluid 80 to be circulated may be defined by previously conducting experiments and analyses.

A manufacturing method of the electrode plate 100 of the present embodiment using the electrode plate manufacturing apparatus 1 will be described. During manufacturing the electrode plate 100, the electrode material 130 fed into the partitioning unit 90 is continuously sent from a lower part of the electrode material 130 toward the first facing position A by each rotation of the first roll 10 and the second roll 20.

The electrode material 130 having reached the first facing position A passes through the gap GA by each rotation of the first roll 10 and the second roll 20, and is pressed between the first outer circumferential surface 11 of the first roll 10 and the second outer circumferential surface 21 of the second roll 20 during passing through the gap GA. Through this pressing, particles in the electrode material 130 are bonded together by effect of the bonding material 122 in the electrode material 130. In this manner, the electrode material 130 having passed through the first facing position A is formed into an active material layer 131 in a sheet form.

Herein, the active material layer 131 formed at the first facing position A tends to adhere to either surface of the first outer circumferential surface 11 of the first roll 10 or the second outer circumferential surface 21 of the second roll 20, which has a faster moving speed at the first facing position A. The active material layer 131 formed at the first facing position A also tends to adhere to either surface of the first outer circumferential surface 11 of the first roll 10 or the second outer circumferential surface 21 of the second roll 20, which has a greater radius of curvature at the first facing position A.

As aforementioned, in the electrode plate manufacturing apparatus 1, the second roll 20 has a faster circumferential speed than that of the first roll 10. The second roll 20 has a greater radius than that of the first roll 10. This means that the active material layer 131 formed at the first facing position A adheres to the second outer circumferential surface 21 of the second roll 20. Hence, as shown in FIG. 2, the active material layer 131 formed at the first facing position A adheres onto the second outer circumferential surface 21 of the second roll 20 having passed through the first facing position A.

The active material layer 131 formed at the first facing position A is then conveyed through the rotation of the second roll 20 to reach the second facing position B, as shown in FIG. 2. As shown in FIG. 2, the current collecting foil 110 is conveyed to pass through the second facing position B. Hence, the active material layer 131 having reached the second facing position B through the rotation of the second roll 20 passes together with the current collecting foil 110 through the gap GB at the second facing position B. At the time of passing through the gap GB, the current collecting foil 110 and the active material layer 131 are pressed together in their thickness directions by the second roll 20 and the third roll 30.

At the second facing position B, the active material layer 131 that is pressed tends to adhere to either surface of the second outer circumferential surface 21 of the second roll 20 or the first surface 111 of the current collecting foil 110, which has a faster moving speed at the second facing position B. At the second facing position B, the active material layer 131 that is pressed tends to adhere to either surface of the second outer circumferential surface 21 of the second roll 20 or the first surface 111 of the current collecting foil 110, which has a greater radius of curvature at the second facing position B.

As aforementioned, the third roll 30 of the electrode plate manufacturing apparatus 1 of the present embodiment rotates at a circumferential speed at which the moving speed of the first surface 111 of the current collecting foil 110 at the second facing position B becomes faster than the circumferential speed of the second roll 20. The third roll 30 on which the current collecting foil 110 is wound has a greater radius than that of the second roll 20. Hence, at the second facing position B, the active material layer 131 is transferred from the second outer circumferential surface 21 of the second roll 20 onto the first surface 111 of the current collecting foil 110.

As shown in FIG. 2, the active material layer 120 is transferred on the first surface 111 of the current collecting foil 110 that has passed through the second facing position B. In the electrode plate manufacturing apparatus 1, the first roll 10, the second roll 20, and the third roll 30 are continuously rotated in this manner, whereby the electrode plate 100 having a long length in the conveyance direction of the current collecting foil 110 is manufactured.

In the electrode plate manufacturing apparatus 1 of the present embodiment, during manufacturing the electrode plate 100, the first circulating unit 43, the second circulating unit 53, and the third circulating unit 63 respectively circulate the fluid 80 through the corresponding flow passage rolls connected to the respective circulating units. As aforementioned, the first circulating unit 43 can decrease the temperature of the first flow passage roll 40 to be lower as the temperature of the first roll 10 becomes higher. The second circulating unit 53 can decrease the temperature of the second flow passage roll 50 to be lower as the temperature of the second roll 20 becomes higher. The third circulating unit 63 can decrease the temperature of the third flow passage roll 60 to be lower as the temperature of the third roll 30 becomes higher.

By decreasing the temperature of the first flow passage roll 40, it is possible to decrease the temperature of the first roll 10 in contact with the first flow passage roll 40. By decreasing the temperature of the second flow passage roll 50, it is possible to decrease the temperature of the second roll 20 in contact with the second flow passage roll 50. By decreasing the temperature of the third flow passage roll 60, it is possible to decrease the temperature of the third roll 30 in contact with the third flow passage roll 60. Through this, in the present embodiment, it is possible to maintain each temperature of the first roll 10, the second roll 20, and the third roll 30 to be constant.

This means that at the first facing position A and at the second facing position B, heat is generated by friction due to pressing of the electrode material 130 and the active material layer 131. With this generated heat, each temperature of the first roll 10, the second roll 20, and the third roll 30 during which the electrode plate 100 is manufactured probably becomes increased with time. However, in the present embodiment, if the temperature of the first roll 10 becomes increased, it is possible to decrease the temperature of the first roll 10 by the first flow passage roll 40. If the temperature of the second roll 20 becomes increased, it is possible to decrease the temperature of the second roll 20 by the second flow passage roll 50. If the temperature of the third roll 30 becomes increased, it is possible to decrease the temperature of the third roll 30 by the third flow passage roll 60.

Herein, for example, if it is impossible to suppress increase in temperature of each of the first roll 10, the second roll 20, and the third roll 30, each of the first roll 10, the second roll 20, and the third roll 30 becomes gradually larger in its radial direction due to expansion with heat along with progress of the manufacturing of the electrode plate 100. The gap GA at the first facing position A becomes smaller due to the expansion of the first roll 10 with the heat than that before the expansion with the heat. The gap GA at the first facing position A and the gap GB at the second facing position B become smaller due to the expansion of the second roll 20 with heat than that before the expansion with the heat. The gap GB at the second facing position B becomes smaller due to the expansion of the third roll 30 with heat than that before the expansion with the heat.

Specifically, if at least one of the temperatures of the first roll 10 and the second roll 20 becomes increased, the thickness of the active material layer 131 formed on the second roll 20 becomes smaller than that before the increase in temperature. If at least one of the temperatures of the second roll 20 and the third roll 30 becomes increased, the thickness of the active material layer 120 transferred onto the current collecting foil 110 becomes smaller than that before the increase in temperature. This means that as the temperatures of the first roll 10, the second roll 20, and the third roll 30 become higher, the thickness of the active material layer 120 of the electrode plate 100 tends to be smaller.

To the contrary, in the electrode plate manufacturing apparatus 1 of the present embodiment, each temperature of the first roll 10, the second roll 20, and the third roll 30 is maintained to be constant, whereby the expansion of each roller with the heat is suppressed so as to maintain each radius thereof to be constant. Through this, it is possible to maintain each of the gap GA at the first facing position A and the gap GB at the second facing position B to have a constant distance. Accordingly, it is possible to manufacture the electrode plate 100 having the active material layer 120 with a constant thickness in the conveyance direction of the current collecting foil 110.

In the electrode plate manufacturing apparatus 1 of the present embodiment, increase in temperature of each of the first roll 10, the second roll 20, and the third roll 30 can be suppressed by the first flow passage roll 40, the second flow passage roll 50, and the third flow passage roll 60. To the contrary, for example, in the configuration in which the flow passages are respectively formed inside the first roll 10, the second roll 20, and the third roll 30, and the fluid is circulated through the flow passages, strength in each of the first roll 10, the second roll 20, and the third roll 30 becomes smaller. If each of the first roll 10, the second roll 20, and the third roll 30 has a smaller strength, it might be difficult to bring the active material layer 131 after passing through the first facing position A and the active material layer 120 after passing through the second facing position B to have appropriate thicknesses. This is because each of the first roll 10, the second roll 20, and the third roll 30 having a smaller strength might be deformed by reacting force from pressing of the electrode material 130 at the first facing position A and reacting force from the pressing of the active material layer 131 at the second facing position B. To the contrary, in the present embodiment, no flow passages are provided in the first roll 10, the second roll 20, and the third roll 30; therefore, it is possible to maintain each temperature of the rolls to be constant without deteriorating rigidity of the rolls.

In the present embodiment, as aforementioned, each of the first flow passage roll 40, the second flow passage roll 50, and the third flow passage roll 60 has the elastic layer 72 made of carbon fibers on the outer circumference thereof. Specifically, each of the first flow passage roll 40, the second flow passage roll 50, and the third flow passage roll 60 has an outer circumferential surface the hardness of which is smaller than that of each of the first roll 10, the second roll 20, and the third roll 30 in contact with the corresponding flow passage rolls.

However, each of the first flow passage roll 40, the second flow passage roll 50, and the third flow passage roll 60 may have no difference in hardness from each of the first roll 10, the second roll 20, and the third roll 30 in contact with the corresponding flow passage rolls. In this case, it is also possible to decrease each temperature of the first roll 10, the second roll 20, and the third roll 30. However, if each of the first flow passage roll 40, the second flow passage roll 50, and the third flow passage roll 60 has no difference in hardness from each of the first roll 10, the second roll 20, and the third roll 30 in contact with the corresponding flow passage rolls, each contact area therebetween becomes smaller. Each of the first roll 10, the second roll 20, and the third roll 30 is required to have a high rigidity. Hence, if each of the first flow passage roll 40, the second flow passage roll 50, and the third flow passage roll 60 has a high rigidity, each contact area thereof with each of the first roll 10, the second roll 20, and the third roll 30 becomes smaller.

To cope with this, in the electrode plate manufacturing apparatus 1 of the present embodiment, a contact portion of each outer circumferential surface of the first flow passage roll 40, the second flow passage roll 50, and the third flow passage roll 60 that is pushed against and in contact with each of the first roll 10, the second roll 20, and the third roll 30 becomes deformed in a manner as to be recessed. Through this, each of the contact area between the first roll 10 and the first flow passage roll 40, the contact area between the second roll 20 and the second flow passage roll 50, and the contact area between the third roll 30 and the third flow passage roll 60 is set to be greater than a contact area between each roll and each corresponding flow passage roll that have no difference in hardness therebetween. Accordingly, in the present embodiment, it is configured to smoothly transfer heat between the first roll 10 and the first flow passage roll 40, between the second roll 20 and the second flow passage roll 50, and between the third roll 30 and the third flow passage roll 60, respectively. In other words, it is configured to efficiently decrease each temperature of the first roll 10, the second roll 20, and the third roll 30 by each of the first flow passage roll 40, the second flow passage roll 50, and the third flow passage roll 60 in a short time.

If the cored bar 71 has a smaller hardness than a hardness of each of the first roll 10, the second roll 20, and the third roll 30, no elastic layer 72 is required to be provided on the cored bar 71. However, by providing the elastic layer 72 on the cored bar 71, it is possible to set the contact area between each of the first roll 10, the second roll 20, and the third roll 30 and each corresponding flow passage roll to be greater. As the elastic layer 72 for each of the first flow passage roll 40, the second flow passage roll 50, and the third flow passage roll 60, a gel sheet or the like mainly containing silicone other than carbon fibers and enhancing the heat transfer coefficient may be used. However, as the elastic layer 72, carbon fibers that are a material having a high elasticity, a high abrasion resistance, and a high heat transfer coefficient may be used.

In the electrode plate manufacturing apparatus 1 of the present embodiment, each of the first roll 10, the second roll 20, and the third roll 30 is provided with the flow passage roll. However, by providing at least one of the first roll 10, the second roll 20, and the third roll 30 with the flow passage roll, it is also possible to exert the effect of the flow passage roll. If one of the first roll 10, the second roll 20, and the third roll 30 is provided with the flow passage roll, only the second roll 20 may be provided with the flow passage roll. The second roll 20 is configured to press the electrode material 130 at the first facing position A, and also press the active material layer 131 at the second facing position B. Hence, by suppressing at least the expansion of the second roll 20 with the heat, it is possible to suppress change in distance of the gap GA at the first facing position A and change in distance of the gap GB at the second facing position B.

If two of the first roll 10, the second roll 20, and the third roll 30 are provided with the flow passage rolls, the third roll 30 in addition to the second roll 20 may be provided with the flow passage rolls. The electrode plate 100 is manufactured by pressing the current collecting foil 110 together with the active material layer 120 at the second facing position B. Hence, the change in distance of the gap GB at the second facing position B influences the thickness of the active material layer 120 in the electrode plate 100 more than the change in distance of the gap GA at the first facing position A does.

Each of the first circulating unit 43, the second circulating unit 53, and the third circulating unit 63 is configured to vary the flow rate of the fluid 80 to be circulated. This is because as the flow rate of the fluid 80 to be circulated is set to be higher, it is possible to suppress increase in temperature among the first flow passage roll 40, the second flow passage roll 50, and the third flow passage roll 60. In other words, as the flow rate of the fluid 80 to be circulated is set to be higher, it is possible to suppress increase in temperature among the first roll 10, the second roll 20, and the third roll 30.

Specifically, the first circulating unit 43, the second circulating unit 53, and the third circulating unit 63 may be configured to decrease the temperature of the fluid 80 to be circulated to be lower, and also increase the flow rate of the fluid 80 to be higher as the temperature output from each of the first temperature sensor 45, the second temperature sensor 55, and the third temperature sensor 65 becomes higher. Alternatively, without carrying out the temperature adjustment of the fluid 80, the first circulating unit 43, the second circulating unit 53, and the third circulating unit 63 may be configured to circulate the fluid 80 at a higher flow rate as the temperature output from each of the first temperature sensor 45, the second temperature sensor 55, and the third temperature sensor 65 becomes higher. In this case, the first circulating unit 43, the second circulating unit 53, and the third circulating unit 63 may not be provided with the first temperature adjusting unit 44, the second temperature adjusting unit 54, and the third temperature adjusting unit 64, respectively. Degree of increase in flow rate of the fluid 80 to be circulated may be defined by previously conducting experiments and analyses.

It may be configured that none of the first circulating unit 43, the second circulating unit 53, and the third circulating unit 63 carries out the adjustment of the temperature of the fluid 80 and the adjustment of the flow rate of the fluid 80. This is because it is possible to exert effect to suppress increase in temperature among the first flow passage roll 40, the second flow passage roll 50, and the third flow passage roll 60 simply by circulating the fluid 80 therethrough.

As aforementioned in details, the electrode plate manufacturing apparatus 1 of the present embodiment includes the first flow passage roll 40, the second flow passage roll 50, and the third flow passage roll 60 inside each of which the flow passage 75 is formed. While the electrode plate 100 is manufactured, the fluid 80 is circulated through each flow passage 75 of the first flow passage roll 40, the second flow passage roll 50, and the third flow passage roll 60 by the first circulating unit 43, the second circulating unit 53, and the third circulating unit 63. Accordingly it is possible to suppress increase in temperature among the first roll 10, the second roll 20, and the third roll 30, thereby maintaining the dimension of each roll to be constant. Through this, it is possible to realize the manufacturing method of the electrode plate having the active material layer with a uniform thickness.

The present embodiment is merely an example, and it is not intended to limit the present disclosure at all. Hence, the present disclosure may naturally be modified and changed in various manners without departing from the scope of the present disclosure. For example, in the aforementioned present embodiment, there has been explained the case of forming the active material layer 120 only on the first surface 111 of the current collecting foil 110, but the active material layer 120 may also be formed on the second surface 112 of the current collecting foil 110. The active material layer 120 may be formed on the second surface 112 of the current collecting foil 110 in the same manner as the case of forming the active material layer 120 on the first surface 111 in the aforementioned embodiment.

For example, in the electrode plate manufacturing apparatus 1 according to the above embodiment, the third roll 30 is arranged on the right side of the second roll 20. However, the arrangement of the third roll 30 is not limited to this, and the third roll 30 may be arranged downward of the second roll 20.

For example, in the aforementioned embodiment, each of the plurality of flow passage rolls is provided with the circulating unit allowing the fluid to flow through the inside of each flow passage roll. However, the plurality of flow passage rolls may be provided with a single circulating unit. In other words, it may be configured to circulate the fluid through the plurality of flow passage rolls using a single circulating unit. Nevertheless, as aforementioned, by providing each of the flow passage rolls with the circulating unit, it is possible to adjust the circulation temperature of the fluid to be circulated for each flow passage roll.

What is claimed is:

1. A manufacturing method of an electrode plate, the manufacturing method using an electrode plate manufacturing apparatus including:
   a first roll that has a first outer circumferential surface;
   a second roll that has a second outer circumferential surface facing the first outer circumferential surface, the second roll rotating in a direction in which a moving direction of the second outer circumferential surface at a first position where the first outer circumferential surface and the second outer circumferential surface face each other becomes the same as a moving direction of the first outer circumferential surface;

a third roll that has a third outer circumferential surface facing the second outer circumferential surface at a second position different from the first position, the third roll rotating in a direction in which a moving direction of the third outer circumferential surface at the second position becomes the same as the moving direction of the second outer circumferential surface;

at least one flow passage roll that includes a flow passage thereinside, the flow passage roll having an outer circumferential surface so disposed as to be in contact with at least one of the first outer circumferential surface, the second outer circumferential surface and the third outer circumferential surface; and a circulating unit configured to circulate fluid through the flow passage;

the manufacturing method comprising;

circulating the fluid through the flow passage by the circulating unit such that a temperature of the flow passage roll is decreased;

bringing an electrode material containing an active material and a bonding material to pass through the first position so as to form an active material layer on the second roll; and winding a current collecting foil on the third roll, and bringing the current collecting foil to pass through the second position so as to transfer the active material layer on the second roll onto the current collecting foil to be formed into an electrode plate, wherein the electrode plate manufacturing apparatus includes:

a temperature output unit configured to detect and to output a temperature of at least one of the first roll, the second roll and the third roll in contact with the at least one flow passage roll; and a temperature adjusting unit configured to adjust a temperature of the fluid such that the temperature of the fluid when the temperature output from the temperature output unit is high is set to be lower than the temperature of the fluid when the temperature output from the temperature output unit is low.

2. A manufacturing method of an electrode plate, the manufacturing method using an electrode plate manufacturing apparatus including:

a first roll that has a first outer circumferential surface;

a second roll that has a second outer circumferential surface facing the first outer circumferential surface, the second roll rotating in a direction in which a moving direction of the second outer circumferential surface at a first position where the first outer circumferential surface and the second outer circumferential surface face each other becomes the same as a moving direction of the first outer circumferential surface;

a third roll that has a third outer circumferential surface facing the second outer circumferential surface at a second position different from the first position, the third roll rotating in a direction in which a moving direction of the third outer circumferential surface at the second position becomes the same as moving direction of the second outer circumferential surface;

at least one flow passage roll that includes a flow passage thereinside, the flow passage roll having an outer circumferential surface so disposed as to be in contact with at least one of the first outer circumferential surface, the second outer circumferential surface and the third outer circumferential surface; and a circulating unit configured to circulate a fluid through the flow passage;

the manufacturing method comprising;

circulating the fluid through the flow passage by the circulating unit such that a temperature of the flow passage roll is decreased;

bringing an electrode material containing an active material and a bonding material to pass through the first position so as to form an active material layer on the second roll; and winding a current collecting foil on the third roll, and bringing the current collecting foil to pass through the second position so as to transfer the active material layer on the second roll onto the current collecting foil to be formed into an electrode plate, wherein the electrode plate manufacturing apparatus includes a temperature output unit configured to detect and to output a temperature of at least one of the first roll, the second roll and the third roll in contact with the at least one flow passage roll, and the circulating unit configured to adjust a flow rate of the fluid such that the flow rate of the fluid when the temperature output from the temperature output unit is high is set to be higher than the flow rate of the fluid when the temperature output from the temperature output unit is low.

* * * * *